M. WHITMAN.
SHEAVE.
APPLICATION FILED DEC. 6, 1909.
973,092.
Patented Oct. 18, 1910.
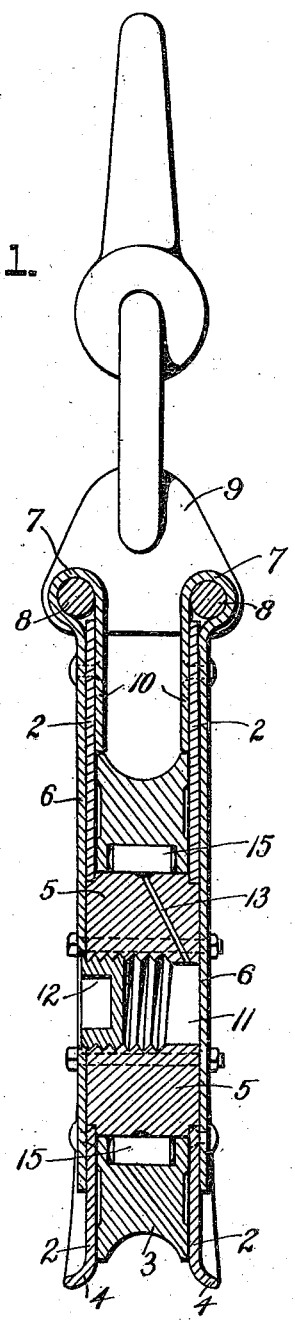
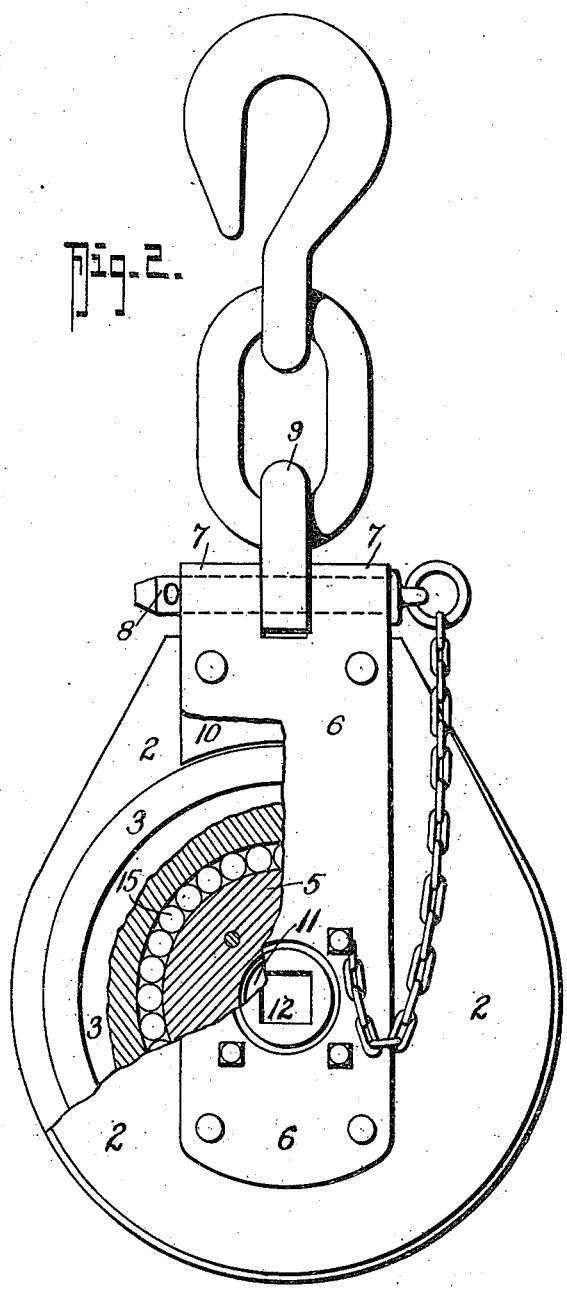
WITNESSES:
Charles H. Wagner.
John T. Schrott.
INVENTOR
Marcellus Whitman.
BY
Fred G. Dieterich
ATTORNEY.

UNITED STATES PATENT OFFICE.

MARCELLUS WHITMAN, OF VANCOUVER, BRITISH COLUMBIA, CANADA.

SHEAVE.

973,092.   Specification of Letters Patent.   Patented Oct. 18, 1910.

Application filed December 6, 1909. Serial No. 531,628.

*To all whom it may concern:*

Be it known that I, MARCELLUS WHITMAN, a citizen of the Dominion of Canada, residing at Vancouver, in the Province of British Columbia, Canada, have invented a new and useful Sheave, of which the following is a specification.

This invention relates to a sheave block for a steel wire rope and is particularly designed for use in logging operations where these blocks are subjected to particularly rough and heavy work and are required to endure long sustained hauls and generally working on the ground are much exposed to dust and grit. Where an ordinary bearing pin is used under such conditions of service and the lubricant is not very carefully attended to the bearing of the sheave on the pin may be destroyed in one long haul as the pull on the block is frequently a very heavy one.

My improvement is chiefly directed to the provision of a roller bearing for the sheave, by which not only am I enabled to use a hollow cast iron pin of ample diameter and lubricate the same from within, but if the lubrication is for any reason neglected no injury will be entailed on the bearing as rollers will run safely without lubrication. There are also several features of construction especially fitting the block for the rough and heavy usage to which such are exposed in logging operations, to which specific features attention will be drawn in the following specification, reference being made to the drawings by which it is accompanied, in which:

Figure 1 is a vertical section on the line A A in Fig. 2 and Fig. 2, a side elevation and part section.

In these drawings 2 represents the side plates of the block which are formed of thin sheet steel and where they extend beyond the periphery of the grooved pulley or sheave 3 they are outwardly flared as at 4. These plates 2 are bored to receive the shouldered ends of a hollow cast iron pin 5 and over the pin aperture in each plate is riveted a reinforcing strap, plate 6 which toward one end is bent inward to form an eye 7 for the reception of the pin 8 by which each plate is secured to the triangular yoke 9 by which the sheave is suspended or connected to its support. These bent over ends of the strap plates are carried down as at 10 and conform closely to the curvature of the sheave. The securing rivets here pass through the double thickness of the strap plates 5 so that they are in double shear where the greater strength is required.

The sheave pin 5 is of ample diameter and is cast hollow to form a grease receptacle 11 one end of the receptacle being closed by the strap plate 6 on that side and the other is provided with a screwed plug 12 by which the grease or other lubricant may be forced through a passage 13 leading from the back end of the receptacle to the center of the periphery of the pin on which the rollers run.

The sheave 3 is bored to closely fit the pin at its two side washers but is chambered between to receive the rollers 15 the ends of which rollers may be slightly convex to lessen the end friction.

The yoke 9 which connects the side plates 2 together, and through which the block is suspended to its support, is introduced in the mid-length of the bent over eyes 7 of the strap plates 6, one of the pins 8 being removable to facilitate the introduction of the wire rope in the block. This yoke 9 thus prevents in a simple and effective manner, the pull of the block from closing the side plates 2 on the sheave 3.

A light, strong and serviceable sheave block is thus constructed that will effectually stand the heavy haul and rough usage to which these blocks are subjected, and in which owing to the use of a roller bearing a strong cast iron pin may be made use of without increasing the frictional resistance of the sheave bearing; and, what is of more importance, the roller bearing renders the block less dependent on its lubrication although ample accommodation is provided therefor in a simple and practical manner.

The manner in which the rollers are introduced in a chambered recess of the sheave itself, effectually prevents the dirt or grit from finding its way into the bearing which is a defect commonly experienced in sheave blocks applied to logging work.

Having now particularly described my invention and the manner of its use, I hereby declare that what I claim as new and desire to be protected in by Letters Patent is:

1. A sheave block comprising a pair of sheet metal side plates, a cylindrical hollow pin having portions of reduced diameter at its ends to enter apertures in said side plates, a grooved sheave bored to receive such pin and turn thereon, sheet metal strap plates secured to each side plate over the pin apertures thereof, the upper ends of said strap plates being bent to form eye members and projected downwardly toward said sheave, said downwardly projected portions being cut away to conform to the curvature of the periphery of said sheave and said side plates having outwardly flared portions and a yoke, pin connected with said eye members, substantially as shown and for the purposes described.

2. A wire rope sheave block comprising a pair of side plates having apertures, a cylindrical pin held between said side plates and having end portions of reduced diameter to enter the apertures of said side plates, said cylindrical pin having a bore through the same, sheet metal strap plates secured to said side plates and of a width to close the apertures of said side plates, one of said strap plates having an aperture alining with the bore of said pin, a block threaded into said pin through the aperture of said side plate, said pin having a capillary aperture extending from said bore upwardly to the peripheral surface of said pin, a sheave mounted to turn on said pin, roller bearings interposed between said sheave and said pin, said sheave having a chamber of a depth substantially equal to the diameter of said roller bearings, substantially as shown and for the purposes described.

In testimony whereof I have signed my name to this specification in the presence of two subscribing witnesses.

MARCELLUS WHITMAN.

Witnesses:
ROWLAND BRITTAIN,
ALEXANDER SMITH.